Dec. 4, 1956  R. W. ARNDT  2,772,487
BATCH DRYING BIN
Filed July 21, 1952  3 Sheets-Sheet 1

Inventor:
Raymond William Arndt
By Wilmer Mechlin
his Attorney

Dec. 4, 1956 R. W. ARNDT 2,772,487
BATCH DRYING BIN
Filed July 21, 1952 3 Sheets-Sheet 3

Inventor:
Raymond William Arndt
By Wilmer Mechlin
his Attorney

United States Patent Office 2,772,487
Patented Dec. 4, 1956

2,772,487

BATCH DRYING BIN

Raymond William Arndt, Columbus, Nebr.

Application July 21, 1952, Serial No. 299,940

7 Claims. (Cl. 34—174)

The present invention relates to improvements in crop dryers for grain and the like.

Due to weather conditions each year in different parts of the country, large quantities of different grains are harvested containing an excess of moisture, or which are otherwise wet, causing them to spoil, during storage, particularly when heated as by the warmer atmospheric temperatures of the spring or summer. This results in considerable loss either in the crop itself, especially if the stored crop contains 30% or more of moisture, or in a reduction of the value or selling price of the crop if it contains 20% to 25% moisture. This condition or circumstance has been recognized for many years and some previous attempts have been made to dry the grain crop so as to relieve it of this excess moisture in order that it may be stored for a long period in good condition. These proposals involve very costly and cumbersome stationary apparatus usually located at a certain place, such as at a grain elevator, and are of such character as to be impractical or not adaptable to use by farmers desiring to store their own grain.

The present invention, therefore, has for its main aim the provision of an improved mobile dryer adapted for use by farmers and will efficiently, quickly and uniformly dry the grain crop at relatively small cost. It is also an object of this invention to provide such a dryer of a "knock-down" construction that may be assembled or disassembled by its users with facility and celerity, or which, when so assembled, may be easily moved from place to place or barn to barn.

To accomplish the aims or objects of the present invention, it has been found that the grain can be more efficiently and quickly handled and dried in batches in a bin by means of heated air forced into a horizontally disposed foraminous plenum within said bin and surrounded by a layer of grain (to be dried) of maximum uniform thickness inconsistent with efficient drying thereof, the heated air being evenly distributed into a bin and disbursed through the surrounding grain by the foraminous plenum, the confining walls of the bin opposing the plenum being perforated or foraminated throughout their area to allow the discharge of the heated air therethrough and of the evaporated moisture entrained with said heated air.

Further, to carry-out the above aims and objects into practice, the improved and novel type bin of the present invention comprises, broadly, a frame-work supporting spaced and opposed foraminous side-walls, and a foraminous trough-like bottom wall and end walls, one of which latter has an enlarged opening therein to be connected with a source of heated-air supply under pressure; and the bin has disposed horizontally therein a foraminous tubular shell forming a plenum extending from end wall to end wall and supported thereby, the walls or surfaces of said shell being spaced substantially uniformly from the side and bottom walls and from the open top of the bin to provide, preferably, a uniform thickness of grain thereabout through which the heated-air can pass to the outside atmosphere. The bin is filled through its open top to a distance above the shell as will provide the same thickness as at the side and bottom of the shell and the bin is equipped with a shielded auger extending along its troughed bottom wall to discharge each dried batch of grain from the bin.

It is important that the volume of the grain being dried be such that the heated-air will pass therethrough without undue retardation so that the moisture entrained therewith will be carried off and out of the bin. The layer of grain bounding the plenum should always be of maximum thickness consistent with efficient drying in order that as much grain as possible may be dried in each batch; and, with a force-draft heater, as shown and described in my co-pending application, Serial No. 172,155, now Patent No. 2,699,769, furnishing the heated-air to the dryer, the thickness of this layer should be about 18 inches for the best results.

Other objects will be apparent from the following detailed description and from the accompanying drawings which disclose the invention as now devised.

The invention resides in the combination and organization of parts shown and described and in the sundry details of construction thereof as will now be specified.

In the drawings, which form part of this specification by reference,

Figure 5 is a longitudinal sectional view taken on line 5—5 of Figure 3 illustrating the driving assembly of the auger or screw conveyor;

Figure 6 is a sectional view taken on line 6—6 of Figure 5 illustrating the supporting end plate at the drive end of the screw conveyor; and Figure 7 is a detail view illustrating the interlocked panels, which form the walls of the bin and of the plenum chamber, and also illustrating the means for holding said panels to the supporting frame-members.

Figure 1:
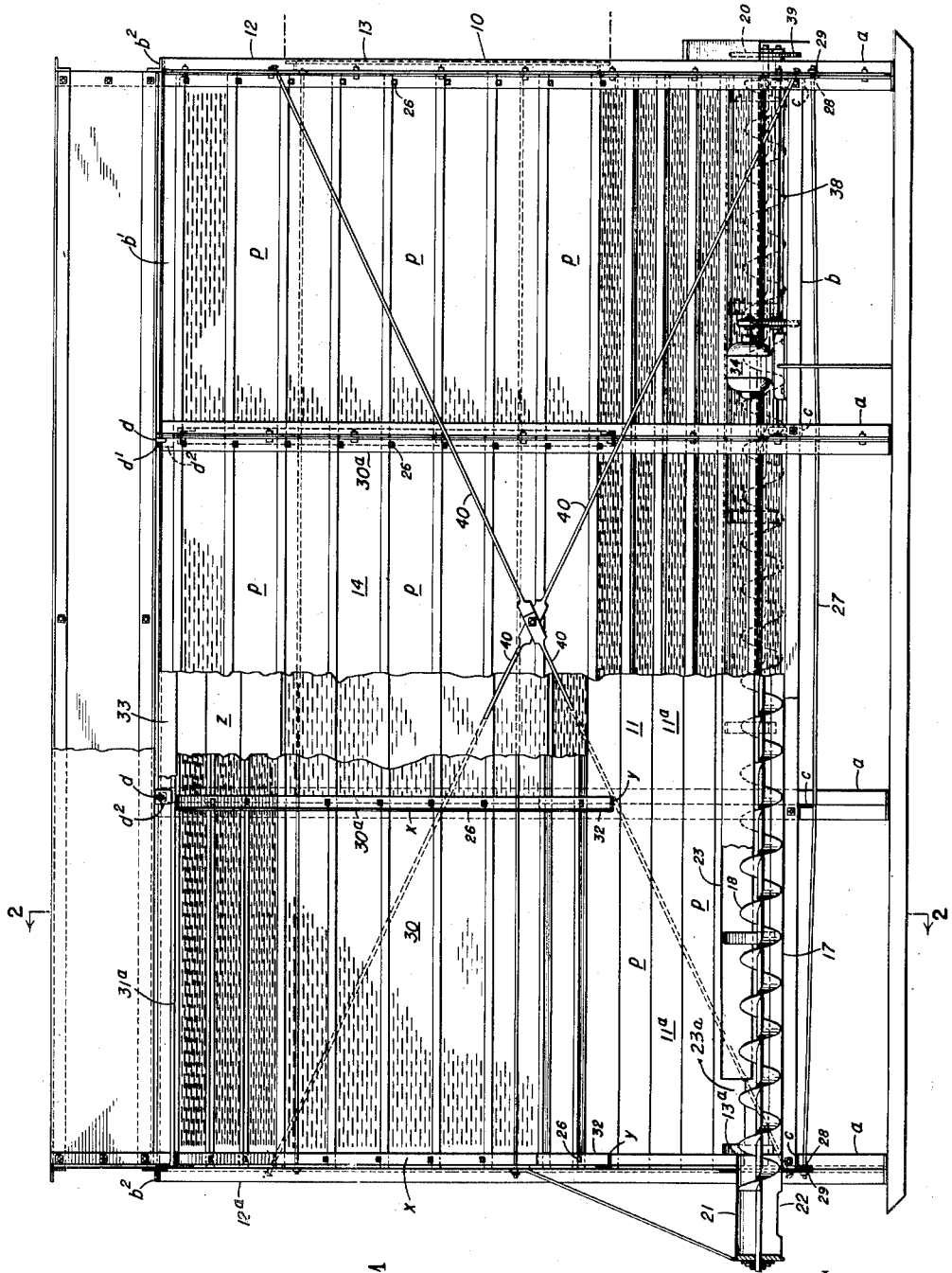
Figure 1 is a side view of the batch bin grain dryer of this invention illustrating in elevation one end portion in elevation carrying the motor for driving the auger and illustrating the other end portion in longitudinal section.

Referring in detail to the drawings, in which like characters refer to similar and like parts, 10 denotes a "knock-down" supporting frame for the bin which is, preferably, rectangular in shape with its longest dimension horizontal. The frame 10 comprises a plurality of uprights $a$ arranged in two spaced rows at each side of the bin, the uprights on each side of bin being in spaced alignment and opposing similar uprights on the opposite side of the bin. The uprights at each side of the bin are connected and held in spaced relation by horizontally disposed ledges or stringer members $b$ and $b'$, the stringer member $b$ being positioned a slight distance above the lower end of its uprights $a$ and detachably secured thereto by bolts or the like and the stringer member $b'$ extending across and being similarly secured to the top ends of its uprights.

Each pair of opposing uprights $a$ on each side of the bin are connected by a horizontally disposed cross-bar $c$ secured at their ends to the adjacent uprights by bolts, or other detachable fasteners, at a point under or near the stringer members $b$; and each pair of uprights at the ends of the frame 10 are connected by a ledge bar $b^2$. X-braces 40 connect the end uprights on each side of the frame 10 in order to add to the stability of the frame. The stringer or ledge members $b'$ on opposite sides of the bin frame 10 are connected by rods $d$ spanning across the frame 10 at spaced intermediate points of its length to transversely brace the top of the frame 10; however, these rods $d$ are not positioned in place until the bin has been assembled. The rods $d$ are provided with hook end $d'$ which engages about the ledges $b'$ and each has a turn-buckle $d^2$ intermediate its ends to permit tightening or loosening.

A pair of diverging bars $e$ extend upwardly, from spaced points on opposite sides of the medial point of each cross-bar $c$ and in an inclined position, to the adjacent upright $a$, thus forming transverse diagonal braces for the frame 10 as well as joists or supports for the downwardly converging portions $11^a$ of the bottom wall 11 of the bin proper, the ends of the brace bars $e$ being detachably secured to this cross-bar $c$ and uprights $a$ by bolts or the like.

The uprights $a$ each preferably comprise two co-extensive angle-irons arranged with a flange of each in contiguous abutting relation so as to form a T in cross-section, the abutting flanges being detachably secured together in any suitable or approved manner. These uprights are positioned so that the flat surface thereof forming the top of the T-configuration, will face inwardly of the bin and against which will engage the wall material of the bin. It is also proposed that the stringers $b$ and $b'$, the cross-bars $c$, and the brace bars $e$ be of angle-irons.

The lower ends of the uprights $a$ on each side of the bin frame 10 rest upon and are removably secured to a skid underlying said uprights so that the bin may be slid over the ground or other supporting surface from place to place where it is most convenient to dry the grain.

End walls 12 and $12^a$ are mounted, respectively, at each end of the frame 10 and occupy the area between each pair of end uprights $a$, its brace bars $e$ and the transverse ledge bars $b^2$, these end walls being removably secured to said parts of the frame and forming the end walls of the bin proper. It is preferred that these end walls be imperforate except that one wall, such as wall 12, as shown, is formed with an enlarged opening 13 forming the inlet for forced heated air to be introduced into the bin, such, for instance, as by a heater shown and described in my aforesaid co-pending application, and the other end wall $12^a$ is provided with a discharge opening $13^a$ at its lower center portions.

The side walls 14 and the bottom wall 11 of the bin are perforated throughout their area and disposed within and detachably secured to the frame 10, the side walls bearing against the uprights $a$ and bottom wall portion $11^a$ resting upon the brace bars $e$ to provide a trough-like bottom. In order to provide said walls of light-weight material which is durable and will resist internal pressures within the bin and, at the same time, will permit easy assemblage and disassemblage of the bin, use is preferably made of interlocked foraminous metallic panels $p$, known on the market as "Steelox" panels and these panels are assembled, as shown in Fig. 7, to form wall lengths which are then slid into position.

To facilitate the insertion and removal of the panels $p$ to and from place, during the erection or the dismantling of the bin, the end walls 12 and $12^a$ are each provided along both their marginal side and bottom edges with retaining and guide strips 15 which follow the contour of the end walls but are spaced inwardly from the outer edges of said end walls sufficiently to provide a passage $14^a$ between said strips and said uprights $a$ and brace bar $e$ to receive the panels $p$. Thus, a series of properly dimensioned panels $p$ assembled in interlocking relation may be inserted into the top of the guide passage $14^a$ at one side of the bin frame and moved downwardly, as a sheet, to form one side and one-half of the bottom wall 11 of the bin with their continuous flat surface innermost—i. e., facing the interior of the bin—the individual panels having sufficient flexibility so that they will bend around corners such as at the juncture of the brace bars $e$ with the uprights $a$ and will continue down the guideway $14^a$ to a point adjacent the lower ends of said brace bars $e$, thus forming the side walls and bottom walls of the bin.

Preliminarily to the insertion of the side and bottom walls in place, as just described, two individual panel members $p'$ (similar to the panel members $p$) are placed on the lower inclined ends of the brace bars $e$ and are each abutted by angular stop members 16 secured to the lower ends of the brace-bars $e$ thus providing a slot at the bottom of the trough-like bottom 11 and extending longitudinally of the bin. This slot is bridged throughout its length by an elongated concaved or arcuate sump plate 17 that forms a bottom wall or surface for an auger or conveying screw 18. This plate 17 has its longitudinal side edges resting upon and overlapping the lower marginal edge portion of the panel members $p'$.

The auger 18 is, then, inserted through an opening $13^a$ in the end wall $12^a$ to extend the length of the bin and has one end 19 of its shaft extending through a bearing opening in the end wall 12 and carrying a sprocket wheel 20. The other end of the auger projects for a slight distance exteriorly of the bin beyond the end wall $12^a$ and is enclosed by a sleeve member 21 having a discharge opening 22 provided in the underside thereof. A hood 23, preferably of a shed formation, overlies the auger 18 and is supported in spaced relation to the sloping portions $11^a$ of the bottom wall by downwardly supporting legs 24 (in the form of inverted U-shape bolts) disposed at intervals along its length and extended through openings in the arcuate plate 17 and through the panel $p'$, where they are secured in position by suitable nuts 25 (see Fig. 6). The hood 23 overlies the auger 18 for the length of the latter except for the short distance $23^a$ at its discharge end and within the bin so as to allow this uncovered portion $23^a$ of the auger to act as a pressure release should the outlet opening 22 become plugged or stopped.

Consequently, when the continuous curtain or strip of interlocked panels $p$ are inserted into the guide passages $14^a$ on both sides of the bin, their lower ends abut the panels $p'$ and thus complete the side and bottom wall structure of the bin.

At spaced intervals the interlocking flange portions $f$ of the panel $p$ may be anchored in position to the uprights $a$ and brace bar $e$ by means of J-bolts 26 engaging over the ends of the interlocked portions of the flanges and having their shank extending through suitable openings in said uprights and brace bars and secured in position by nuts $26^a$.

In order to give added stability to the entire structure, a tie-rod 27 extends the length of the bin through openings 28 formed in the medial portion of the cross bars $c$ and are held in position by threaded nuts 29 on the ends thereof and bearing against the end cross bars $c$, respectively.

As has been emphasized in the forepart of this specification, the gravamen of the present dryer is the provision of a horizontally disposed foraminous tube forming a plenum chamber 30 extending from end wall to end wall of the bin so arranged in position that the thickness of the layer of the grain surrounding the plenum will be uniform in batch drying. To this end, each of the end walls 12 and $12^a$ is provided on its inner surface with a hexagonal guideway 31 formed by opposed and spaced strips or angle-irons 32, the guide-way 31 on wall 12 surrounding the forced air inlet 13 therein. As shown, particularly in Figs. 1 and 2 of the drawings, these hexagonal guide-ways 31 are positioned opposite each other to support the plenum chamber at its opposite ends. Each of these hexagonal guide-ways 31 has two elongated sides $x$ spaced equally from its adjacent side walls 14 and substantially parallel therewith, and has two lower angular portions $y$ converging downwardly toward each other and equally spaced from opposite portions 11ᵃ of the trough-like bottom 11 to the same extent or amount as the side portions x are spaced from the side walls 14. The upper portion of each hexagonal guide-way 31 has two upwardly converging angular portions z, the apex of which extends substantially to the upper edge of the end walls 12 or 12ᵃ. The guide-ways 31 may, and preferably do, comprise coextensive and spaced strips or angle bars 32 secured to their respective end walls, the spacing providing the guide-way 31 sufficiently to receive a series of foraminous interlocked panels $p^2$ arranged in the same manner as the panel p described in connection with the side and bottom walls 14 and 11 of the bin.

These assembled panels $p^2$ may be placed in position, to form the plenum chamber 30, by inserting them at the open top end 31ᵃ of the guide-way 31 so that they may move downwardly along one-half of the guide-way, then inserting another string or curtain of said assembled panels through the opening 31ᵃ at an angle so that it will move downwardly along the other half of the guide-way, thus forming the foraminous plenum. As shown particularly in Fig. 2 of the drawings, the lower portions of the bottom faces y of the plenum may be omitted, thus providing a longitudinal slot at the underside thereof, but is not necessary. After the plenum chamber is so formed, hexagonal frame members 30ᵃ (see Fig. 1) may be positioned within said chamber at spaced intervals intermediate its ends to bear against the interlocking flange of said panel at right-angles thereto and secured thereto by J-bolts 26 (in the same manner as shown in Fig. 7) at selected points, thus reinforcing the intermediate portions of the plenum chamber. An inverted V-shaped cover 33 may have its opposing flanges or legs inserted in between the panels $p^2$ and the guide-way 31, as shown, to close the opening 31ᵃ of the guide-way 31.

Of course, it will be understood that, if the bin of this invention is not constructed of the "knock-down" type, the side and bottom walls thereof and the plenum chamber may be supported and held in position by means other than that herein described.

In order to provide for and maintain the proper thickness of the layer of grain over the top angular surface of the plenum, a vertical extension 34 is provided to removably rest upon the top of the bin. This extension is a rectangular frame dimensioned to have its end walls overlie the end walls 12 and 12ᵃ of the bin and have its side walls off-set inwardly from the side walls 14 of the bin. The grain is fed to the bin through the top of said extension and, as the grain piles above the plenum along its longitudinal center, the lower edge portions of the extension 34 causes the grain to slope on both sides of the longitudinal center of the bin downwardly toward the side walls 14, thus providing a layer of grain overlying the plenum chamber of substantially the same thickness as that surrounding the other portions of the plenum chamber. As moist or wet grain will shrink or reduce in volume as it dries, the pile of grain confined by the extension 34 will gravitate downwardly to replenish the reduced volume and, at the same time, cause the thickness of the layer of the grain to remain substantially the same. The spaces between the top edges of the side walls 14 of the bin and the sides of the extension 34 provide elongated slots allowing the escape of heated air and entrained moisture which has filtered through the grain upwardly from the plenum chamber.

Figure 2:
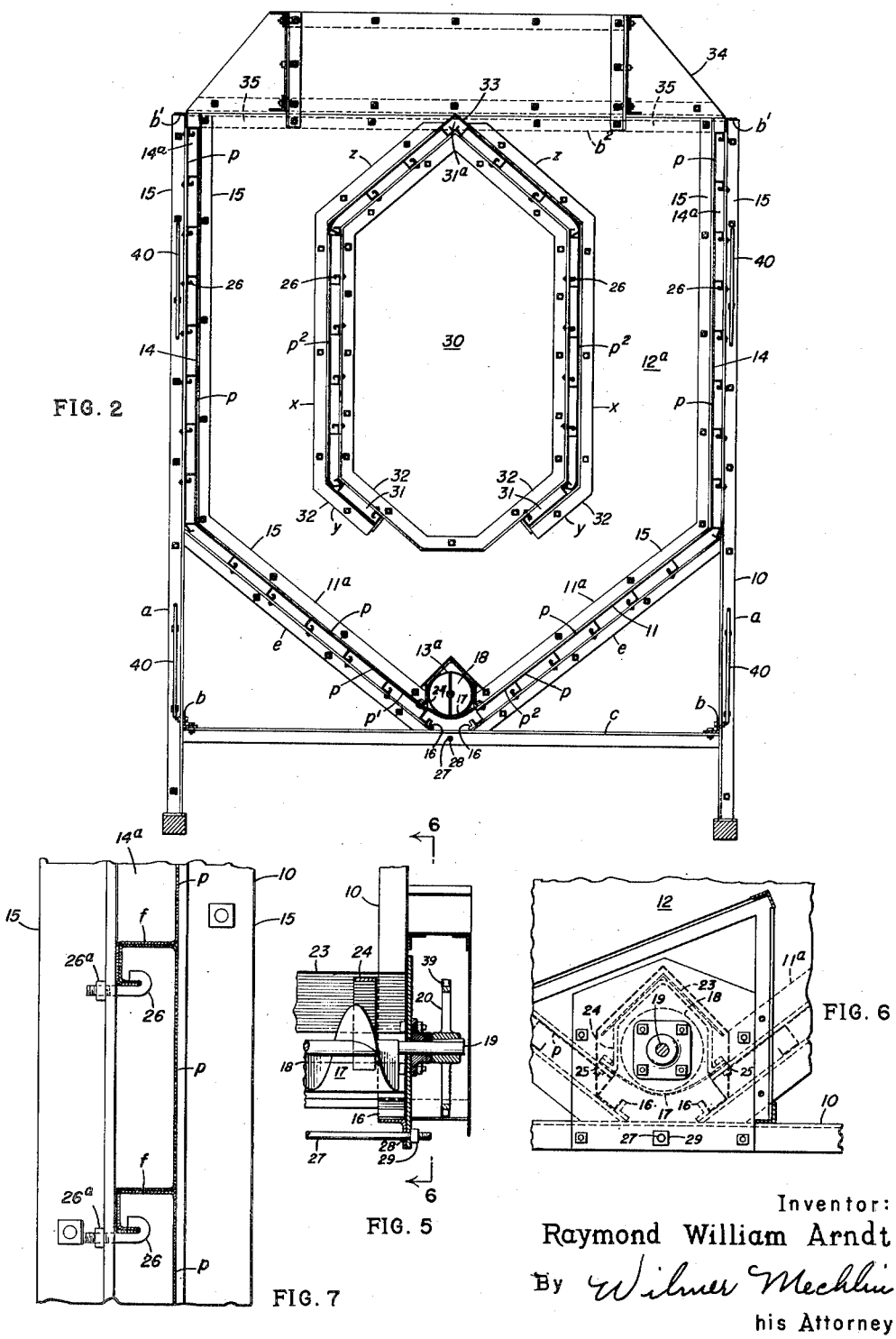
Figure 2 is a transverse sectional view of the dryer taken substantially on line 2—2 of Figure 1.
Figure 3:
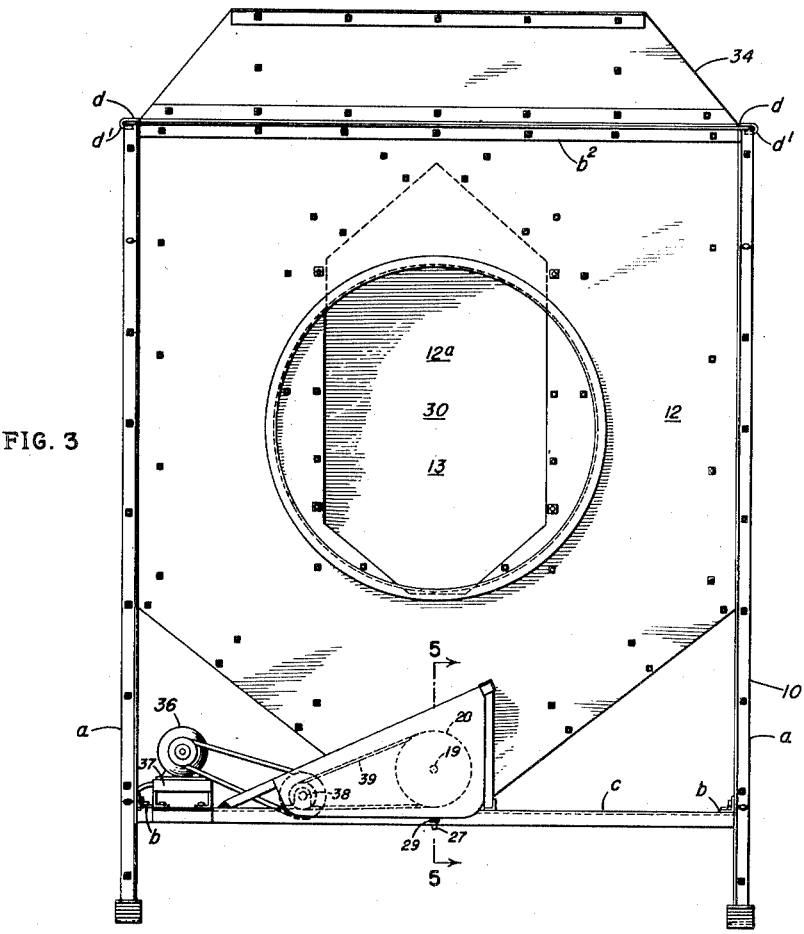
Figure 3 is an end elevation of the inlet end of the bin.
Figure 4:
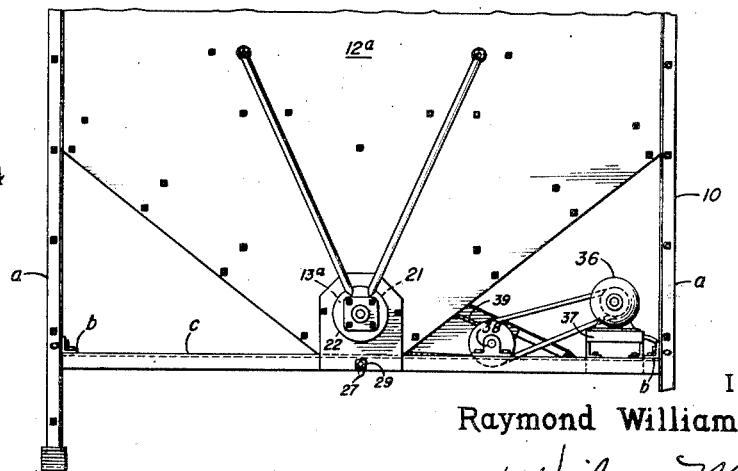
Figure 4 is a fragmentary rear end elevation of the discharge end of the bin.

The auger 18 is driven from motor 36 mounted on a platform 37 which rests upon and extends between two of the cross-bars c as shown in Fig. 1. The motor drives a reduction gearing and by means of a shaft 38 and a sprocket chain 39, entrained over the sprocket wheel 20, drives the auger 18.

It will thus be seen that the construction above described provides an inexpensive "knock-down" bin that may be assembled and disassembled by mechanically unskilled persons and that the construction of the bin is such as produces maximum efficiency in drying grains such as wheat, corn, hay, oats, barley, rye, rice, soybeans, sorghum, peanuts, flax, mustard seeds and grass seeds. The temperature of the forced heated air delivered to the plenum chamber 30 should be about 180° F. but for seed-grains the temperature should be about 110° F. so that germination qualities are not injured. The dryer has a large capacity in that a bin 12 feet long 6¼ feet wide and 10 feet high has dried 1,000 bushels of wet corn per 8-hour day and reduced the moisture content from an approximate average of 32% down to an approximate average of 13% at a cost of about 2½¢ per bushel. It is therefore, obvious that the objects and aims of this invention have been attained and that dryers of this invention offer great advantages and benefits to the individual farmer over prior practices.

Having thus described the invention and the manner in which the same is to be performed, it is to be understood that the invention is not to be limited to the exact construction herein illustrated and described as the same is susceptible to modification and variation and that the invention is only to be limited by the spirit thereof and the scope of the appended claims.

That which is claimed, as new, is:

1. In a drying bin for grain and the like, two spaced end walls, a pair of transversely spaced guide-slots formed on each of the inner opposing faces of said end walls and each spaced inwardly of a margin of the associated end wall, said guide-slots of each pair extending downwardly from their top edges for a distance and then being directed inwardly and downwardly and terminating at a point short of meeting, interlocking foraminous wall members having their ends slidably received in opposing slots in opposite end walls respectively for insertion and removal, whereby vertical side walls and converging bottom wall portions are provided for said bin, a sump-plate bridging the space between said converging bottom wall portions, and a screw-conveyor means mounted in the bin and overlying said sump-plate.

2. In a drying bin for grain and the like, two spaced end walls connected at their side edge portions by foraminous side walls, a foraminous trough-like bottom wall, a guide-slot formed on each of the inner opposing faces of said end walls about a substantially central portion thereof and having an entrance opening therein, foraminous wall members having their opposite ends slidably insertable in and removable from said guide slots, respectively, through said entrance opening and forming a tubular plenum chamber within said bin.

3. In a drying bin for grain and the like, two spaced end walls connected at their side edge portions by foraminous side walls, a foraminous trough-like bottom wall, a hexagonal guide-slot formed on each of the inner opposing faces of said end walls about a substantially central portion thereof and having an entrance opening therein, foraminous wall members having their opposite end edges slidably inserted in said hexagonal guide slots, respectively, through said entrance openings and forming a tubular plenum chamber within said bin with two opposite faces opposing said side walls of the bin, two other faces opposing, respectively, the sloping portion of the trough-like bottom wall and the remaining two faces facing generally the top side of the bin and sloping downwardly toward said side walls of the bin.

4. A knock-down drying bin for grain and the like comprising a supporting frame including two series of spaced and aligned uprights forming supporting members for opposite sides of the bin, upper and lower ledge members connecting the uprights of each series, lower cross-bars one connecting opposite uprights of each series, a pair of diverging brace bars extending from the center portion of each cross bar to its adjacent upright, end walls connecting opposite end uprights of each series, said parts being detachably secured together, guide strips on the inner faces of each end wall and inwardly spaced from their end uprights and substantially parallel therewith for a distance downwardly from the top edge of said wall from whence the guide strips converge to a point short of meeting and being spaced and substantially parallel with said brace bars, foraminous side wall members having their end edges slidably disposed in the space provided between said guide strips and bearing against said brace bars and said uprights, means for detachably securing said wall members in position, whereby side walls and sloping bottom wall portions are provided for the bin.

5. A drying bin as set forth in claim 4 further characterized by a hexagon guide slot formed on each of said inner opposing faces on said end walls at a substantially central portion thereof and having an entrance opening therein, foraminous wall members spanning a distance from said end walls and having their end edges slidably received in said hexagon guide slot to form a plenum chamber within the bin, with two opposite faces opposing said side walls of the bin and two other faces opposing, respectively, the sloping portion of the trough-like bottom wall and the remaining two faces facing generally the top side of the bin and sloping downwardly toward said side walls of the bin one of said end walls having an inlet opening communicating with said plenum chamber, and screw conveyor means mounted along the center portion of said bin and discharging through one of said end walls.

6. A drying bin for grain and the like comprising vertical solid end walls, vertical foraminous side walls and a foraminous trough-like bottom wall adapted to retain the material placed within said bin to be dried, a foraminous horizontally disposed tubular shell within said bin and connected at its ends to said end walls, respectively, and having one of its ends opening through the adjacent end wall to receive forced heated air therethrough, thereby forming a plenum chamber, said shell being formed and dimensioned that its walls are substantially uniformly spaced from said side and bottom walls of said bin, whereby the material to be dried surrounding said plenum chamber is of substantially uniform thickness and the heated air is evenly distributed and dispersed throughout said surrounding material and discharges through said foraminous walls of said bin into ambient atmosphere, the lower portion of said trough-like bottom wall of said bin being formed with a longitudinally extending sump portion, an augur rotatably mounted in said bin and extending along said sump portion, a discharge outlet in one end wall of said bin and aligned with said augur, a hood overlying the length of said augur except for a distance near said outlet and within said bin, and means securing and supporting said hood in position spaced from the surface of said bottom wall, whereby to provide a grain inlet slot along the length of the hooded portion of said augur on opposite sides of the augur.

7. A drying bin for grain and the like comprising vertical solid end walls, vertical foraminous side walls and a foraminous trough-like bottom wall adapted to retain the material placed within said bin to be dried, a foraminous horizontally disposed tubular shell within said bin and connected at its ends to said end walls, respectively, and having one of its ends opening through the adjacent end wall to receive forced heated air therethrough, thereby forming a plenum chamber, said shell being formed and dimensioned that its walls are substantially uniformly spaced from said side and bottom walls of said bin, whereby the material to be dried surrounding said plenum chamber is of substantially uniform thickness and the heated air is evenly distributed and dispersed throughout said surrounding material and discharges through said foraminous walls of said bin into ambient atmosphere, said bin being open at its top side, and a bin extension having vertical end and side walls overlying and supported on said top side of said bin, the side walls of said extension being offset inwardly from the side walls of the bin for a distance providing an open space therebetween, whereby, when said bin and its extension are filled with material to be dried, shrinkage in the bulk of material being dried is replenished by gravity from said extension and said sides of the latter cause said material to slope downwardly toward the sides of said bin with a thickness overlying said plenum chamber that is substantially the same as the thickness of material otherwise surrounding said chamber and allowing the heated air from the plenum chamber to discharge through the space between said extension and the side walls of the bin.

References Cited in the file of this patent

UNITED STATES PATENTS

| | | |
|---|---|---|
| 245,602 | Barton | Aug. 16, 1881 |
| 630,908 | Mershon et al. | Aug. 15, 1899 |
| 1,050,889 | White | Jan. 21, 1913 |
| 1,191,753 | Wegner | July 18, 1916 |
| 1,341,676 | Robert | June 1, 1920 |
| 2,209,073 | Cowin | July 23, 1940 |
| 2,299,299 | Bills | Oct. 20, 1942 |
| 2,388,297 | Slaughter | Nov. 6, 1945 |
| 2,532,530 | Andersen et al. | Dec. 5, 1950 |
| 2,598,388 | Harter | May 27, 1952 |
| 2,641,988 | Perkins | June 16, 1953 |

FOREIGN PATENTS

| | | |
|---|---|---|
| 245,212 | Italy | Feb. 20, 1926 |
| 378,313 | Great Britain | Aug. 11, 1932 |